March 6, 1934.  A. J. WEATHERHEAD, JR  1,949,668
COUPLING
Filed Jan. 18, 1932
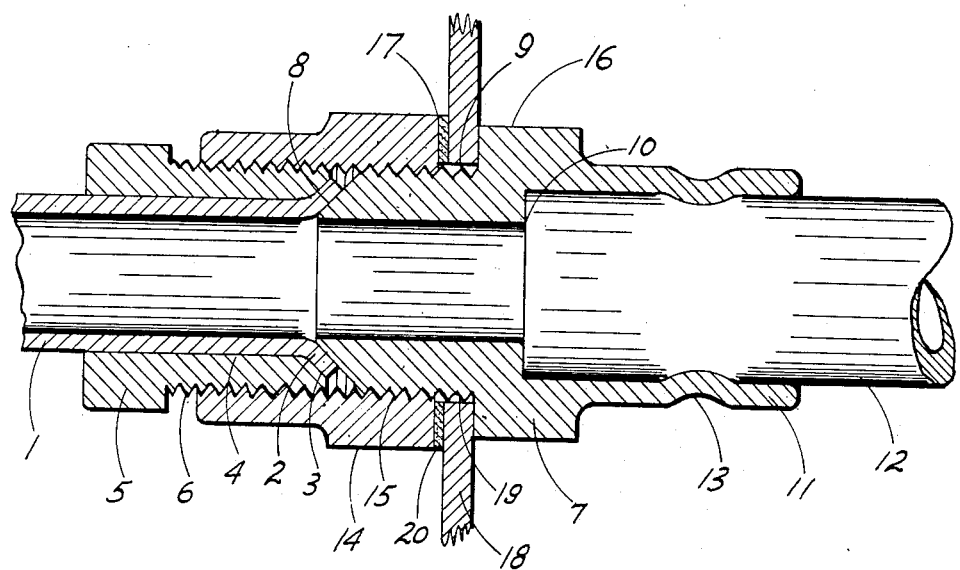
Inventor
ALBERT J. WEATHERHEAD JR.
By Richey & Watts
Attorney Patented Mar. 6, 1934

1,949,668

UNITED STATES PATENT OFFICE 1,949,668

COUPLING

Albert J. Weatherhead, Jr., Cleveland, Ohio, assignor to The Weatherhead Company, Cleveland, Ohio, a corporation of Ohio Application January 18, 1932, Serial No. 587,308

1 Claim. (Cl. 285—30)

This invention relates to improvements in couplings of the type adapted to be used for making connections with the ends of copper tubing and the like.

Heretofore, it has been the practice, in connecting copper tubing for fluid conducting purposes in automobiles, refrigerators, and the like, to provide an S. A. E. two-part fitting provided with conical faces adapted to clamp the flanged end of the tube therebetween. Alternatively a fitting of the type disclosed in the Weatherhead Patent No. 1,733,925, of October 29, 1929, has been employed for like purposes.

Inasmuch as the two kinds of couplings are now employed, it is sometimes desirable to unite one member of an S. A. E. fitting with the like member of a Weatherhead fitting. Accordingly it is an object of this invention to provide for joining S. A. E. fittings to like Weatherhead fittings in order to complete the coupling, whether the like fittings be male or female.

For some purpose, it is sometimes desirable to join copper or like tubing to a flexible hose, in which case it is necessary to provide support for the coupling. An illustration of such use of couplings, of the type involved in this invention, is for hydraulic brakes on automobiles where a flexible hose leads to the brake and, at a point of support on the car, is joined to tubing leading from the reservoir of the brake system. Accordingly, it is another object of the invention to provide a coupling for joining tubing and to simultaneously afford a clamping action to secure the coupling upon a support.

Other objects and advantages of the invention will appear in the following detailed description taken in connection with the accompanying drawing in which is shown a view in longitudinal cross section, of a coupling illustrating one embodiment of my invention.

Referring to the drawing, a tube 1 of copper or like material is provided with a flanged end 2 juxtaposed to the conical face 3 formed at the end of the bore 4 of fitting 5 externally screw threaded as indicated at 6. The fitting 5 is a standard Weatherhead male fitting. Since the tube 1 passes through the bore 4 of the fitting 5 and is provided with the outwardly flaring flange 2, the conical face 3 of the fitting 5 flares outwardly in like direction.

Co-operating with the fitting 5 to clamp the flange 2 against the surface 3 is a fitting 7 provided with a conical face 8 oppositely inclined relative to the conical face 3. The fitting 8 is externally screw threaded as indicated at 9 and provided with bore 10 forming a continuation of the passage of the tube 1. As so far described the fitting 7 is a standard S. A. E. fitting. Fitting 7 is provided with collar 11 into which a hose 12 may extend and be secured therein by the inwardly pressed portion 13 of the collar 11.

In order to join the fittings 5 and 7, both of which are externally threaded, a coupling member 13 is provided which is internally threaded, as indicated at 14, to threadedly support the fittings 5 and 7 therein. By arranging the fitting 5 over the flanged end of tube 1 and by screwing the fittings 5 and 7 together in the coupling 13, the flange 2 of the tube 1 may be clamped between the complemental conical faces 3 and 8 as illustrated in the drawing. While the threaded portions of fittings 5 and 7 are illustrated as being of the same diameter in the drawing, and while that construction is preferred, it will be evident to one skilled in the art that fittings 5 and 7 of different thread diameter may be united by a coupling 13 provided with corresponding internal threads of different diameters.

As so far described, the embodiment of the invention illustrated depicts an arrangement for combining like (namely male) fittings of the S. A. E. and the Weatherhead type to form a coupling. Where the fitting is employed to join a copper tube with a flexible hose, it is necessary to provide a support for the coupling.

Accordingly the fitting 7 is provided with the flange 16 and the coupling 14 is provided with a flange 17 which flanges are adapted to co-operate, when the coupling 14 is screwed upon fitting 7 to clamp a member 17 therebetween. The member 18 is provided with an aperture 19 through which the threaded end of the fitting 7 projects. A washer 20 may be provided between the member 18 and the flange 17. The member 18 may be a cross member of an automobile and the hose 12 may lead to the hydraulic brakes of an automobile. Other arrangements and constructions of co-operating parts on the fitting 7 and coupling 14 may be provided for securing the coupling to a support.

While a preferred embodiment of the invention has been described in detail by way of illustration, it is not intended so to limit the invention inasmuch as modifications may be made therein as will be obvious to one skilled in the art within the scope of the invention as defined in the following claim.

What I claim is:

In combination, an externally threaded male fitting having an axial bore, a concentric truncated conical face at one end thereof, and an external flange adapted to engage a support, and an internally threaded coupling sleeve threaded on said flanged fitting, said sleeve having at one end a face cooperating with said flange to secure said support therebetween, the other end of said sleeve projecting beyond said conical face, and cooperating with said conical face to form an internally threaded female fitting adapted to receive another male fitting of a type different from the first mentioned male fitting.

ALBERT J. WEATHERHEAD, Jr.